Patented Nov. 2, 1937

2,097,439

UNITED STATES PATENT OFFICE 2,097,439

THERAPEUTIC PREPARATION AND PROCESS OF MAKING THE SAME

Reinhard Beutner, Louisville, Ky.

No Drawing. Application February 9, 1934, Serial No. 710,529. In Germany August 21, 1933

6 Claims. (Cl. 167—65)

The invention relates to therapeutic preparations containing synthetic compounds which in some respects resemble known artificial resins and to the process of preparing the same.

The synthetic compounds of the present invention or other artificial resins are suitable for use as therapeutic agents and also as vehicles or carriers for medicines and therapeutical preparations.

When used in the former capacity, my new synthetic compounds are characterized by properties valuable for disinfection, local anesthesia and constriction of blood vessels. These properties—particularly local anesthesia and vaso-constriction which have not been known so far—can definitely be traced by experiments on animals, and form the scientific basis for the equally unexpected therapeutic effects of my synthetic compound, and of other artificial resins, in various diseases of the skin.

When used in the latter capacity, viz., as a vehicle or carrier of well-known medicinal agents, additional unexpected advantageous properties are present, the vehicle being capable of carrying the medicinal agents into the pores of the skin by reason of the fact that my new synthetic compound is soluble in the same solvent as will dissolve most medicinal agents for which it forms a base. Moreover, the use of my preparations when used as a vehicle, after evaporation of the solvent, leaves upon the skin a protective coating in which all the added medicinal agents are incorporated and will act upon the skin for a long time.

The substances heretofore used as the vehicle for medicinal agents consist chiefly of various fatty materials. They cannot be used in the described fashion since their solvents, such as benzine or chloroform, are highly poisonous and irritant even to the unbroken skin. Thus, it would be undesirable to use as a vehicle any hard paraffine softened by the addition of chloroform, even though this would also yield a protective covering after the evaporation of the chloroform. Also collodion which is used in this manner requires ether as a solvent which is irritant. In contrast to this, my new synthetic compounds, when used as a vehicle for medicinal and therapeutic agents may be applied even to lesions since their solvent, viz., water+alcohol, has no poisonous or irritating effect thereon.

An object of my invention therefore is to provide preparations containing synthetic resin-like substances and having valuable therapeutic characteristics when used either as medicinal agents or vehicles therefor.

A satisfactory method for preparing my new therapeutic compound comprises the inter-action of formaldehyde or its homologues in the presence of alkaline or acid-condensing agents upon phenols or its homologues, or substitutes, monovalent, bivalent, or trivalent, preferably in solution and by the application of heat, thereafter cooling the mass by the addition of a suitable solvent, such as alcohol, until a high molecular viscous material is formed. Broadly speaking, any aldehyde and any phenol may used as the starting substance. After cooling of the mass by the addition of alcohol or otherwise, a homogeneous colloidal solution ready for application to the skin, disinfecting and anesthetizing infected and inflamed parts thereof, and forming a protective covering over the skin, will be obtained. Whereas any of the well-known phenol-formaldehyde compounds may be used for this purpose, it is preferable to prepare special condensation products differing from those used technically and adapted to their therapeutic purposes in that in their preparation the chemical reactions are allowed to proceed further than is usually done. At first the interaction of phenol or cresol with a solution of formaldehyde is allowed to proceed until a viscous or water insoluble compound is formed. Subsequently the water is driven off by heat, and the resultant resin heated until it forms a solid but still soluble in alcohol mass which is highly elastic and has considerable tensile strength.

Exemplifying the above method of preparing my synthetic compound, the following procedure may be carried out.

Phenol or cresol is heated with a 30%-40% solution of formaldehyde in the presence of a catalyzer, for instance, ½% ammonia, or another alkali or alkaline salt. The mixture is heated on a reflux condenser until a viscous mass is produced, indicating the completion of the reaction between the starting materials. When using phenol and formaldehyde as starting materials with $NH_3$ as catalyzer, the end of the reaction will be indicated by the precipitation of a resin from the boiling mixture. This resin is then heated over a flame in an open container—with or without separation from the supernatant solution—until it is transformed in a semi-solid mass. This second heating is interrupted and the mass rapidly cooled just before the insoluble state is reached, viz., between the so-called "A" and "B" stages. The frequent drawing of samples will indicate the correct moment at which the heating should be interrupted. The product of the method just described may be applied to the skin upon the addition of alcohol in a sufficient amount to render it fluid. The addition of no more than 10%-20% of alcohol will result in the formation of a viscous mass, while the addition of more than 20% alcohol will make a solution.

By the addition of as much as 60%-90% of alcohol a still more fluid prepartion may be obtained which will impregnate the deeper layers of the skin with the medicinal agent for which the solution acts as a carrier. The medicinal action of the agent thus introduced into the deeper layers of skin evidences a markedly intensified therapeutic action, possibly by reason of the more firmly adhering protective layer formed upon the skin.

My synthetic compound prepared as above described contains a slight amount of uncombined phenol (1%-5%) which for some purposes should be removed. The use of an excess of formaldehyde will eliminate this uncombined phenol.

A more efficient method of removing this uncombined phenol consists in dissolving the product in a suitable water-miscible solvent, like alcohol or esters of glycol, or of alcohols, or mixtures of these substances, and precipitating these solutions by pouring them into water.

If uncombined formaldehyde is present in the end product of the process hereinabove described, it may be removed by oxidation with a suitable oxidizing agent.

Substances, prepared like the ones hereinabove described, may be used in the form of a powder, for instance, a dusting powder, with the slight modification that the chemical reaction must be performed in such a manner that a brittle substance is obtained. In the interaction of phenol and formaldehyde, for instance, the modification consists in a relative shortening of the time of interaction of phenol and formaldehyde in the initial stage when water is still present, or in the use of less catalyzer for the same time of interaction. After removing the water by heating or otherwise, the mass is transformed into hard solid resin which can be pulverized. Even if such viscous materials as tar or balm of Peru, etc., are incorporated in this mass, it still is capable of being pulverized due to its tendency to harden up when heated. There is hardly any other method known of transforming such viscous substances, etc., as tar into a powder.

The disinfecting and anesthetic properties of my new preparation can be intensified by substituting side chains of halogens in the phenol resins of the starting material used in preparing the compound. Thus the product made from phenol may have bromine added thereto, the uncombined phenol being thus transformed into non-corrosive tri-bromo phenol. Other halogen compounds, for instance, methyl iodide, may be used for obtaining therapeutically active mixtures when starting from my synthetic compound made either from phenols or urea.

Some of the products described hereinabove may be used internally as they have valuable anti-pyretic properties and are good urinary antiseptics. Since their toxicity is very low, they can be used for such internal applications without deleterious effect.

Having now set forth the nature of my invention, what I claim is the following:

1. A therapeutic preparation capable of producing analgesia and vaso-constriction when applied to the skin, comprising a phenol aldehyde condensation product whose condensation was arrested while still in the alcohol soluble state.

2. A therapeutic preparation capable of producing analgesia and vaso-constriction when applied to the skin, comprising a solution of a phenol aldehyde condensation product whose condensation was arrested while still in the alcohol soluble state in a volatile solvent.

3. A therapeutic preparation capable of producing analgesia and vaso-constriction when applied to the skin, comprising a solution in alcohol of a phenol aldehyde condensation product whose condensation was arrested while still in the alcohol soluble state.

4. A therapeutic preparation capable of producing analgesia and vaso-constriction when applied to the skin, comprising a solution of a phenol aldehyde condensation product whose condensation was arrested while still in the soluble state and a medicament in a non-poisonous volatile solvent capable when applied to the skin of forming an adherent analgesic film holding said medicament firmly incorporated therein.

5. A therapeutic preparation capable of producing analgesia and vaso-constriction when applied to the skin, comprising a solution of a phenol aldehyde condensation product whose condensation was arrested while still in the soluble state and a tarry medicament in a non-poisonous volatile solvent capable when applied to the skin of forming an adherent analgesic film holding said tarry medicament firmly incorporated therein.

6. A therapeutic preparation capable of producing analgesia and vaso-constriction when applied to the skin, comprising the end product of the reaction of a mixture of phenol and formaldehyde carried on in the presence of a catalyst to a point short of conversion of the reaction product to an insoluble state, and a non-poisonous volatile solvent.

REINHARD BEUTNER.